(12) United States Patent
Romero

(10) Patent No.: US 6,245,457 B1
(45) Date of Patent: *Jun. 12, 2001

(54) BUSSING STRUCTURE IN AN ELECTROCHEMICAL CELL

(75) Inventor: Antonio L. Romero, Parkton, MD (US)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/330,009

(22) Filed: Jun. 11, 1999

(51) Int. Cl.[7] ............................. H01M 2/26; H01M 2/00
(52) U.S. Cl. ..................... 429/161; 429/163; 429/170; 429/211; 429/121; 429/122
(58) Field of Search .................... 429/121, 122, 429/161, 163, 170, 211, 94, 208

(56) References Cited

U.S. PATENT DOCUMENTS

| | | |
|---|---|---|
| 3,373,060 | 3/1968 | Gray . |
| 3,490,949 | 1/1970 | Deschamps . |
| 3,503,806 | 3/1970 | Sugalski . |
| 3,682,706 | 8/1972 | Yardney . |
| 4,262,064 | 4/1981 | Nagle . |
| 4,539,274 * | 9/1985 | Goebel .................... 429/94 |
| 4,663,247 | 5/1987 | Smilanich et al. . |
| 4,794,056 * | 12/1988 | Pedicini ................... 429/94 |
| 4,977,043 | 12/1990 | Kadouchi et al. ............. 429/54 |
| 4,983,133 | 1/1991 | Van Scyoc et al. ............ 439/860 |
| 5,021,306 | 6/1991 | Sauer et al. . |
| 5,183,222 | 2/1993 | Ramsey, Jr. . |
| 5,288,564 | 2/1994 | Klein et al. . |
| 5,316,875 | 5/1994 | Murai et al. . |
| 5,439,760 * | 8/1995 | Howard et al. ............... 429/94 |
| 5,501,916 | 3/1996 | Teramoto et al. . |
| 5,660,942 | 8/1997 | Kothari . |
| 5,741,606 | 4/1998 | Mayer et al. ................ 429/53 |
| 5,770,332 * | 6/1998 | Narukawa et al. ............. 429/175 |
| 5,948,562 * | 9/1999 | Fulcher et al. ............... 429/181 |
| 6,020,084 * | 2/2000 | Romero et al. ............... 429/94 |
| 6,051,038 * | 4/2000 | Howard et al. .............. 29/623.1 |

FOREIGN PATENT DOCUMENTS

| | | |
|---|---|---|
| 0 044 753 | 7/1981 | (EP) . |
| 0 620 610 A1 | 4/1994 | (EP) . |
| 0 620 610 B1 | 4/1994 | (EP) . |

OTHER PUBLICATIONS

Japanese Patent Abstract JP5166533 A, Hiroshi et al.; Collective Structure of Layered Thin Battery, Jul. 2, 1993.

\* cited by examiner

Primary Examiner—Gabrielle Brouillette
Assistant Examiner—Tracy Dove
(74) Attorney, Agent, or Firm—Sughrue, Mion, Zinn, Macpeak & Seas, PLLC

(57) ABSTRACT

A bussing structure for bussing current within an electrochemical cell. The bussing structure includes a first plate and a second plate, each having a central aperture therein. Current collection tabs, extending from an electrode stack in the electrochemical cell, extend through the central aperture in the first plate, and are then sandwiched between the first plate and second plate. The second plate is then connected to a terminal on the outside of the case of the electrochemical cell. Each of the first and second plates includes a second aperture which is positioned beneath a safety vent in the case of the electrochemical cell to promote turbulent flow of gasses through the vent upon its opening. The second plate also includes protrusions for spacing the bussing structure from the case, as well as plateaus for connecting the bussing structure to the terminal on the case of the electrochemical cell.

35 Claims, 3 Drawing Sheets

BUSSING STRUCTURE IN AN ELECTROCHEMICAL CELL

BACKGROUND OF THE INVENTION

1. Field of the Invention

The present invention is directed to a bussing structure for bussing current within an electrochemical cell, wherein the bussing structure connects current collection tabs, extending from an electrode stack of the electrochemical cell, to terminals on the outside of the electrochemical cell case (which are used to connect the electrochemical cell to a desired application) such that the overall cell impedance is less than or equal to 1.5 milliohms.

2. Related Art

The related art includes electrochemical cells having electrode stacks with current collection tabs extending therefrom. The current collection tabs are connected to the bottom surface of a washer which is then riveted or otherwise connected to a terminal on the outside of the electrochemical cell, above the washer. The terminal is then used to connect the electrochemical cell to deliver electricity to a desired application. Because the current collection tabs are connected to the bottom of the washer, the connection is susceptible to shear and bending stress when the electrode stack moves within the electrochemical cell. That is, when the electrochemical cell shakes or vibrates during use, the electrode stack moves within the casing of the electrochemical cell. When the electrode stack moves, it produces forces on the current collection tabs, and thus directly on the connection between the current collection tabs and the washer. The forces produced tend to disconnect the current collection tabs from the washer, thus breaking the current path from the electrode stack to the outside of the electrochemical cell, thereby reducing or eliminating the current output from the electrochemical cell.

Additionally, the current collection tabs must be sufficiently long to enable an apparatus to be positioned between the electrode stack and the washer for connecting the tabs to the washer. Further, a plurality of tabs are at one time disposed adjacent to the bottom of the washer and are then connected thereto. Because there are many tabs it is difficult to keep them all adjacent to the washer for connection thereto. Therefore, it is difficult to ensure that all the current collection tabs are sufficiently connected to the washer. Because some tabs are not sufficiently connected to the washer, the current capacity of the electrochemical cell is decreased. Alternatively, if the tabs are connected one at a time, to ensure that they are all sufficiently connected, the process is time consuming and inefficient.

SUMMARY OF THE INVENTION

An object of the present invention is to overcome the problems of the related art. More specifically, an object of the present invention is to provide a bussing structure which allows use of current collection tabs having a short length. Another object of the present invention is to provide a bussing structure which maintains the integrity of the connection between current collection tabs of an electrode stack within an electrochemical cell, and terminals on the outside of the electrochemical cell. Another object of the present invention is to provide a bussing structure which has low impedance, for example less than or equal to 1.5 milliohms, and high conductivity. Another object of the present invention is to provide a bussing structure which facilitates assembly of the electrochemical cell, as well as protects the electrode stack during assembly.

The present invention includes a double plate bussing structure for bussing current from an electrode stack to terminals on the outside of an electrochemical cell, wherein the bussing structure provides low impedance and high conductivity as well as protection of the electrode stack and current collection tabs extending from the electrode stack p The use of a double plate structure allows the current collection tabs to be of a short length, guarantees that every tab will be connected to the bussing structure, and maintains the integrity of the connection between the current collection tabs and the terminals in the face of vibration and shock. Because the current collection tabs are connected at a point that is sandwiched between two plates, any relative movement between the plate structure and the electrode stack, due to vibration or shock, does not act on the connection. That is, there is no shear or bending stress on the connection. Further, the plate structure helps transfer heat from the electrode stack to the electrochemical cell case.

In an electrode stack of an electrochemical cell, a plurality of tabs is connected to each of the electrodes for current collection, and thus extends from opposite sides (positive and negative) of the electrochemical cell. The tabs, on each respective end of the electrode stack, are brought into engagement with the top surface of a first plate. A second plate is put on top thereof to sandwich the tabs between the plates. The plates are then connected together with the tabs therebetween. Each pair of plates is then connected to a terminal on the outside of the electrochemical cell case.

On the negative side of a lithium-ion electrochemical cell, for example, the first plate is preferably made of copper to match the copper material of the negative electrode. However, if another material is used for the negative electrode, as in a different type of electrochemical cell, the first plate may be made of a matching or otherwise compatible material. The use of a copper for the first plate protects the inner contents of the electrode stack from heat and light during the formation of the connection between the current collection tabs and the plate. Further, when the connection is made by welding, for example laser welding, the copper plate is particularly advantageous. The copper plate acts as a reflective surface and heat sink during welding.

In a lithium-ion electrochemical cell, for example, the second plate is preferably made of nickel to facilitate connection to the terminal on the outside of the electrochemical cell case. The use of nickel improves the weld connection to the electrochemical cell case when such is made of stainless steel, and improves the connection to the terminal on the outside of the electrochemical cell case, when the terminal includes a portion coated with nickel. The above choice of materials gives a low impedance, of less than or equal to 1.5 milliohms, and high conductivity between the electrode stack and the negative terminal of the electrochemical cell. Also, the second plate has a particularly advantageous shape. The second plate includes protrusions on the top surface thereof, which top surface faces away from the current collection tabs connected to the bottom of the second plate. The protrusions keep the top of the second plate from contacting the electrochemical cell case so as to maintain a fill space for electrolyte and a space for gasses to escape through a safety vent in the electrochemical cell case.

The second plate, as well as the first plate underneath thereof, include through holes (other than central holes when the plates are of a washer type) to be located beneath the safety vent. The through hole in the plate sandwich is sized relative to the size of the safety vent to promote turbulent flow of gasses through the safety vent upon its opening.

The second plate further includes two plateaus for welding to the electrochemical cell case and to the negative terminal on the electrochemical cell case. The plateaus extend from the second plate top surface in a location so as to match that of holes in the electrochemical cell case used to weld the negative terminal to the electrochemical cell case. The plateaus may have the same height above the second plate surface as that of the protrusions to thereby keep the plate parallel to the cell case.

On the positive side of a lithium-ion electrochemical cell, for example, aluminum plates are used, to match the aluminum material used for the positive electrode. However, if another material is used for the positive electrode, as in a different type of electrochemical cell, the plates may be made of a matching or otherwise compatible material. The plates are connected to the electrochemical cell positive terminal and may also be connected to an aluminum wrap which surrounds the electrode stack, when such wrap is present.

The bussing structure of the present invention permits the winding to be attached directly to the top and bottom of the electrochemical cell case, thereby eliminating the shifting of the winding during vibration and shock. The bussing structure of the present invention may be used in rechargeable electrochemical cells, particularly those used in electric vehicles. The rechargeable electrochemical cells may be of any type, for example, lithium-ion, nickel-metal hydride, nickel cadmium and the like.

BRIEF DESCRIPTION OF THE DRAWINGS

The above and other objects and advantages of the present invention will become more apparent by describing in detail preferred embodiments thereof with reference to the accompanying drawings, wherein.

DETAILED DESCRIPTION OF THE INVENTION

Figure 1:
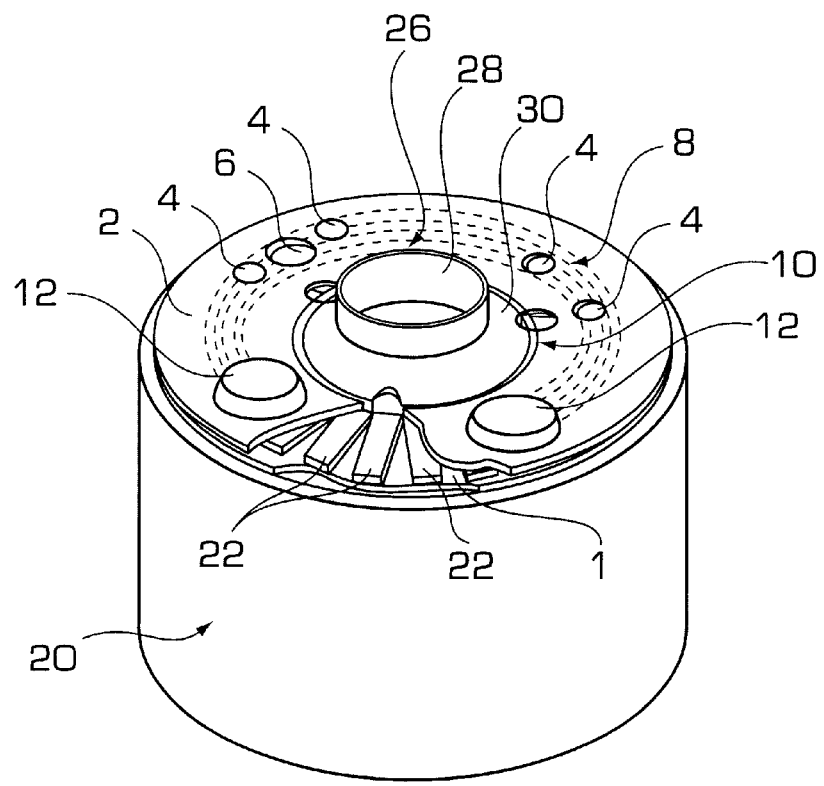
FIG. 1 is a perspective view of a negative side of an electrode stack, of an electrochemical cell, connected to a bussing structure of the present invention.
Figure 2:
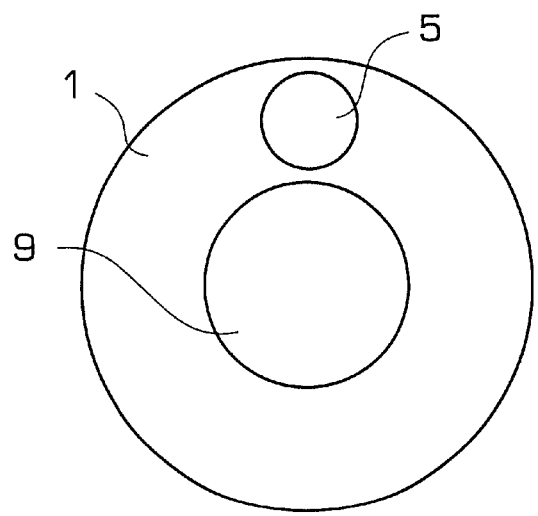
FIG. 2 is a top view of a first plate in the bussing structure of the present invention shown in FIG. 1.
Figure 3B:
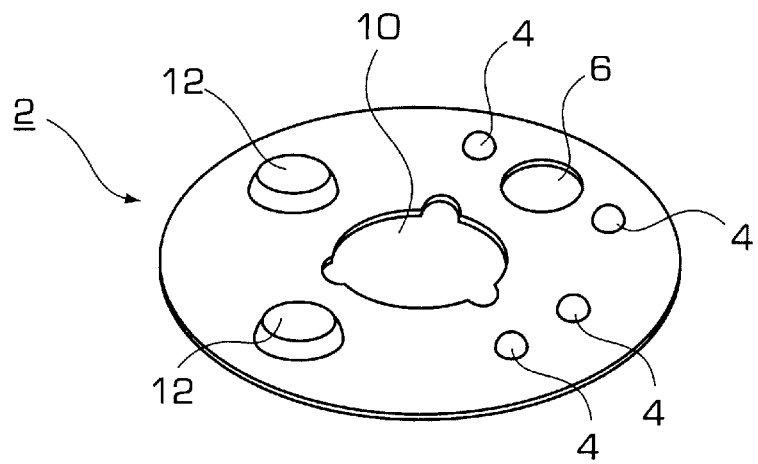
FIG. 3B is a plan view of the second plate shown in FIG. 3A.
Figure 3A:
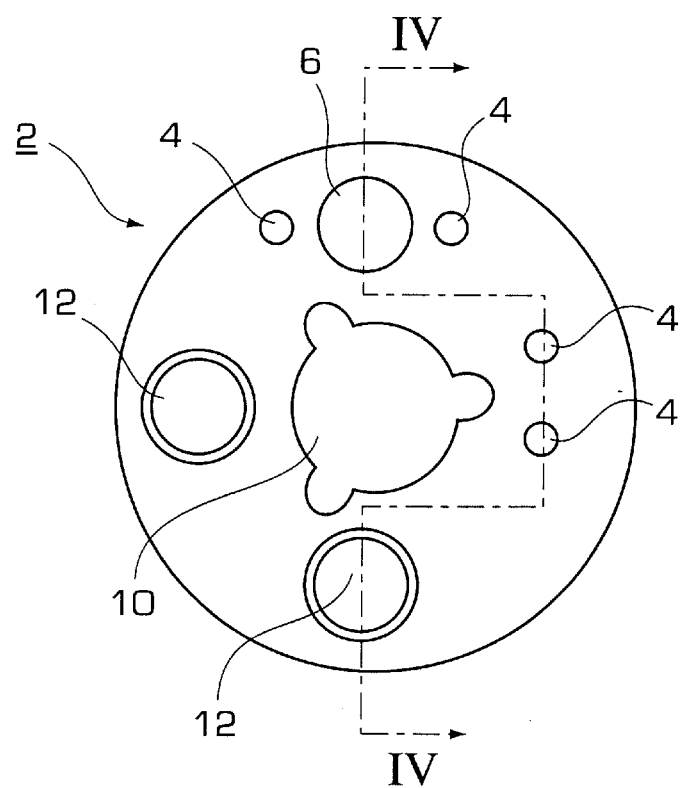
FIG. 3A is a top view of a second plate in the bussing structure of the present invention shown in FIG. 1.
Figure 4:
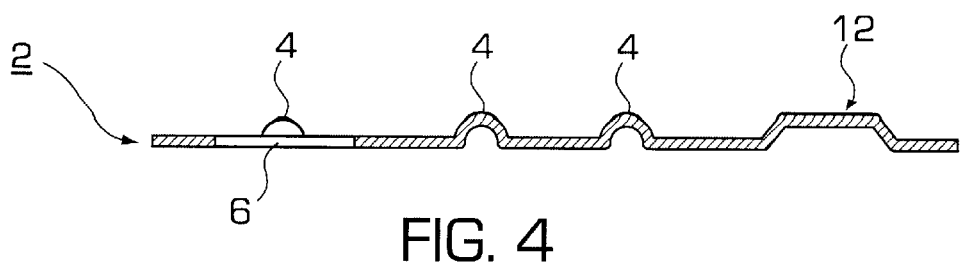
FIG. 4 is a partial cross sectional view of the second plate in the bussing structure of the present invention, taken along line A—A of FIG. 3A.

An electrochemical cell includes an electrode stack 20 having both a positive electrode (not shown) and a negative electrode (not shown), as well as a positive end and a negative end. The electrodes are wound around a hollow core 26 which is disposed at the center of the electrode stack 20. Current collection tabs 22 are connected to the negative electrode, and extend from one end of the electrode stack, whereas current collection tabs 24 are connected to the positive electrode, and extend from another end of the electrode stack. The electrode stack is enclosed in an electrochemical cell case, not shown. The hollow core 26 includes at each end, a first portion 28 having a first diameter. A central portion 30, along the axial direction, of the hollow core 26 includes a second diameter. The first diameter is smaller than the second diameter so that it can be easily connected to the electrochemical cell case while also allowing sufficient space for connection of the bussing structure, terminal, and safety vent to the electrochemical cell case. Thus, the small diameter portions facilitate manufacturing by allowing use of off the shelf components for the electrochemical cell case, safety vent, and terminal. The central portion 30 of the hollow core 26 accommodates the electrodes which are wound thereon. The large diameter of the central portion 30 serves to reduce weight of the electrochemical cell by eliminating electrode windings and electrolyte from the center of the electrochemical cell. Further, the larger diameter central portion 30 creates a more uniform winding of the electrode stack, which thus provides more uniform current, thereby eliminating hot spots in the electrode stack.

A bussing structure for the negative end of the electrode stack will now be described with reference to FIGS. 1–4. The bussing structure of the present invention includes a first plate 1 which is disposed adjacent to the electrode stack 20, and a second plate 2 adjacent to the first plate 1. The current collection tabs 22, extending from the negative electrode, are sandwiched between the first plate 1 and the second plate 2. The first plate 1, the second plate 2 and the current collection tabs 22 are connected together by, for example, welding along concentric lines 8. By welding along the concentric lines 8, connection between the plates 1, 2 and all the current collection tabs 22 is ensured. That is, because the weld lines are concentric with one another, they are spaced along the plates, thereby ensuring that all the current collection tabs 22, even those which do not extend very far across the plates, are connected. The weld lines may be made by, for example, laser welding. Further, when the connection between the current collection tabs 22 and the plates 1, 2 is made by welding, it is done from the side of the second plate 2. That is, the apparatus used to make the weld lines is disposed on the opposite side of the plates 1, 2 as is the electrode stack 20. Therefore, it is unnecessary to have a large space between the first plate 1 and the electrode stack 20. By reducing the necessary space between the first plate 1 and the electrode stack 20, the tabs 22 can be shorter than those in the prior art, thereby decreasing impedance to less than or equal to 1.5 milliohms.

Because of the above construction, the integrity of the connection between the current collection tabs 22 and the plates 1, 2 is maintained in the face of vibration and shock. That is, because the current collection tabs are connected at a point which is sandwiched between the first plate 1, and the second plate 2, any movement of the electrode stack relative to the bussing structure does not act on the connection, thereby enhancing the reliability of the electrochemical cell.

The first plate 1 has a central aperture 9, and a second aperture 5, therein. See FIG. 2. The central aperture 9 is sized to accommodate the central portion 30 of the hollow core 26. Also, the aperture 9 is sized to additionally accommodate current collection tabs 22 which extend therethrough and are folded over the top surface of the first plate 1. That is, the current collection tabs 22 are brought to the center of the electrode stack 20 and inserted through the aperture 9 in the first plate. The current collection tabs are then folded down along the top surface of the first plate 1. Although not shown, the current collection tabs 22 may extend around the outer edge of the first plate 1, instead of through aperture 9, and still be folded down along the top surface of the first plate 1. The aperture 5 allows gasses to flow from the electrode stack to a safety vent located on the case of the electrochemical cell, when the safety vent opens. The aperture 5 is sized relative to the size of the safety vent so as to promote turbulent flow of gasses through the safety vent upon its opening. Moreover, in the case where a hollow core 26 is not used in the electrode stack, the first plate 1 does not necessarily have to include the central aperture 9.

The first plate 1 may be made of the same material as the negative electrode and/or the current collection tabs 22. For example, when copper is used as the negative electrode, as in a lithium ion electrochemical cell, the current collection tabs 22 and the first plate 1 are also preferably made of copper. When the first plate 1 is made of copper, it protects the inner contents of the electrode stack from heat and light during the formation of the connection between the current collection tabs 22 and the plates 1, 2, particularly when the connection is made by using a laser. Thus, when the first plate 1 is made of copper, it acts as a reflective surface and heat sink during welding.

The second plate 2, similar to the first plate 1, includes a central aperture 10 and a second aperture 6. See FIGS. 3A, 3B and 4. The central aperture 10 and second aperture 6 perform in a similar manner as the like elements 9 and 5 of the first plate and, therefore, a detailed description thereof will not be given. However, although the central aperture 10 accommodates hollow core 26, the current collection tabs 22 do not extend therethrough. Further, when a hollow core 26 is not used in the electrode stack, central aperture 10 does not necessarily need to be included.

Additionally, the second plate 2 includes raised portions which extend above the top surface thereof, i.e., on the side of the second plate which faces away from the current collection tabs 22 and first plate 1. Specifically, the second plate 2 includes protrusions 4 and plateaus 12. The protrusions 4 and plateaus 12 are spaced around the top surface of the second plate 2. The protrusions 4 keep the top of the second plate from contacting the electrochemical cell case so as to maintain a fill space for electrolyte and a space for gasses to escape through the safety vent in the electrochemical cell case. The protrusions 4 may be shaped as nipples, bumps, or the like as long as they act as spacers between the electrochemical cell case and the second plate 2. Although four protrusions 4 are shown, any suitable number, either more or less, may be included.

The plateaus 12 extend above the top surface of the second plate 2 in a manner similar to that of the protrusions 4. The top surface of each plateau is flat, and is parallel with the top surface of the second plate 2. The sides of each plateau taper from its top surface to the top surface of the second plate 2. Thus, the plateaus 12 provide a convenient place for connecting the second plate 2 to a portion of the electrochemical cell case as well as to a terminal on the outside of the case. Further, the plateaus 12 may have the same height above the second plate 2 surface as that of the protrusions 4 to thereby keep the plate parallel to the cell case. The plateaus are located at a position which is the same as that of a pair of holes in both the electrochemical cell case and a plate connected to the terminal. The terminal plate, electrochemical cell case, and the plateaus 12 may then be conveniently connected to one another from the outside of the electrochemical cell case by, for example, welding. Additionally, by connecting the plateaus 12 to the electrochemical cell case, movement of the electrode stack 20, during vibration and shock, is minimized. Although two plateaus 12 are shown, any suitable number thereof may be included.

The second plate 2 may be made of any suitable material. However, when the electrochemical cell is of the lithium-ion type, and the electrochemical cell case is made of stainless steel, it is preferable to make the second plate 2 out of nickel. It is preferable to make the second plate 2 out of nickel because such has improved, as compared to copper, welding characteristics with stainless steel. Thus, making the second plate 2 out of nickel facilitates the connection of the second plate, in particular the plateaus 12, to the electrochemical cell case and the terminal plate which is also preferably coated with nickel. Also, by using nickel for the second plate 2 and a coating on the terminal plate on the outside of the electrochemical cell case, the impedance of the connection is reduced while maintaining a high conductivity between the electrode stack and the negative terminal on the outside of the electrochemical cell case.

Figure 5:
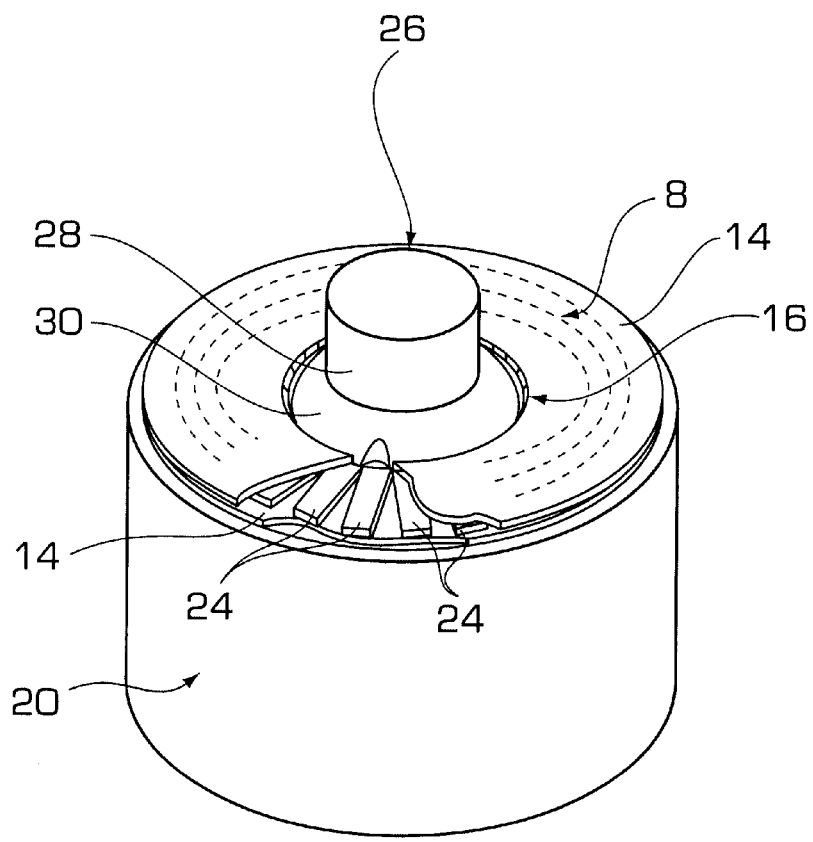
FIG. 5 is a plan view of a positive side of an electrode stack, of an electrochemical cell, connected to a bussing structure of the present invention.
Figure 6:
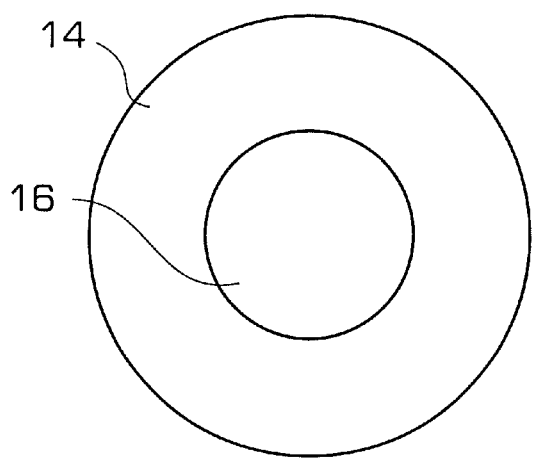
FIG. 6 is a top view of a plate in the bussing structure of the present invention shown in FIG. 5.

A bussing structure for the positive end of the electrode stack will now be described with reference to FIGS. 5 and 6. The two plates 14 of the bussing structure for the positive end of the electrode stack have the same configuration as one another. Each plate 14 includes a central aperture 16 which is sized to accommodate the central portion 30 of hollow core 26 as well as a folded portion of each current collection tab 24. Current collection tabs 24 are sandwiched between the two plates 14. The plates 14 and current collection tabs are then connected to one another, for example, by welding along concentric lines 8. As with the bussing structure for the negative end of the electrode stack, connection along lines 8 ensures that all the current collection tabs 24 are connected to the plates 14. Additionally, the connection between the current collection tabs 24 and the plates 14 is located at a point which is sandwiched between the plates 14, and is thereby protected from vibration and shock thus enhancing the reliability of the electrochemical cell. Further, the plates 14 may be connected to a portion of the electrochemical cell case, thereby also functioning to minimize the shifting of the electrode stack during vibration and shock. Further, although the current collection tabs 24 are shown as extending through a central aperture in the plate 14, they may extend around an outer edge of the plate and be folded along the top thereof. Moreover, in the case where a hollow core 26 is not used in the electrode stack, the plates 14 do not necessarily have to include the central apertures 16.

The plates 14 are preferably made of the same material as the positive electrode and/or the current collection tabs 24. For example, in a lithium ion cell, the positive electrode and current collection tabs are made of aluminum and, therefore, the plates 14 are also preferably made of aluminum. However, any suitable material may be used for the plates 14. Further, the plates 14 may be connected to an aluminum wrap on the outside of the electrode stack, when such wrap is present.

Although the negative end of the electrode stack was described as having a bussing structure including plates of different configurations, whereas the positive end was described as having a bussing structure including plates of a like structure, the reverse is of course possible. That is, the bussing structure for the positive end of the electrode stack could include a plate having protrusions, plateaus, and a hole for disposition adjacent a safety vent, whereas the bussing structure for the negative end of the electrode stack could include plates having only central apertures therein.

As used herein, the term plate includes any other suitable structure, for example, a washer, a disk, and the like. Also, the references to "top" and "bottom" are made with respect to FIGS. 1, 4 and 5 for convenience in explanation. Of course, either end of the electrode stack could be the top or bottom and, further, the bussing structure need not necessarily be on a "top" or "bottom" of an electrode stack as long as it is adjacent to current collection tabs which extend from the electrode stack.

It is contemplated that numerous modifications may be made to the bussing structure of the present invention without departing from the spirit and scope of the invention as defined in the following claims.

I claim:

1. A bussing structure comprising:
   a first plate having a top surface, a bottom surface, and a first aperture;
   at least one current collection tab extending through said first aperture and connected to said top surface of said first plate;
   a second plate having a top surface, and a bottom surface, wherein said bottom surface of said second plate is connected to said at least one current collection tab.

2. The bussing structure according to claim 1, wherein said bottom surface of said second plate is connected to said top surface of said first plate.

3. The bussing structure according to claim 1, wherein said first aperture of said first plate is a central aperture.

4. The bussing structure according to claim 3, wherein said second plate includes a central aperture which is aligned with said central aperture of said first plate.

5. The bussing structure according to claim 3, further comprising at least one weld line concentric with said central aperture.

6. The bussing structure according to claim 5, further comprising a plurality of weld lines concentric with said central aperture and with each other.

7. The bussing structure according to claim 1, wherein said first plate includes a second aperture therein.

8. The bussing structure according to claim 7, wherein said second plate includes an aperture.

9. The bussing structure according to claim 8, wherein said aperture of said second plate is aligned with said second aperture of said first plate.

10. The bussing structure according to claim 1, wherein said second plate includes at least one raised portion extending from said top surface of said second plate.

11. The bussing structure according to claim 10, wherein said at least one raised portion includes a rounded nipple.

12. The bussing structure according to claim 10, wherein said at least one raised portion includes a plateau.

13. The bussing structure according to claim 12, wherein said plateau includes a surface which is parallel to said top surface of said second plate.

14. The bussing structure according to claim 1, wherein said first plate and said second plate are made of the same material.

15. The bussing structure according to claim 14, wherein said first plate and said second plate are made of the same material as said at lest one current collection tab.

16. The bussing structure according to claim 1, wherein said first plate is made of copper and said second plate is made of nickel.

17. An electrochemical cell comprising:
   an electrode stack having at least one current collection tab extending therefrom; and
   a bussing structure which includes:
      a first plate having a top surface, and a bottom surface facing said electrode stack, wherein said at least one current collection tab extends from said electrode stack to said top surface of said first plate and is connected to said top surface; and
      a second plate having a top surface, and a bottom surface, wherein said bottom surface of said second plate is connected to said at least one current collection tab.

18. The electrochemical cell according to claim 17, wherein said bottom surface of said second plate is connected to said top surface of said first plate.

19. The electrochemical cell according to claim 17, wherein said first plate includes a first aperture therein, and said at least one current collection tab extends through said first aperture.

20. The electrochemical cell according to claim 19, wherein said first aperture in said first plate is a central aperture.

21. The electrochemical cell according to claim 20, wherein said second plate includes a central aperture which is aligned with said central aperture of said first plate.

22. The bussing structure according to claim 20, further comprising at least one weld line concentric with said central aperture.

23. The bussing structure according to claim 22, further comprising a plurality of weld lines concentric with said central aperture and with each other.

24. The electrochemical cell according to claim 20, further comprising a hollow core around which said electrode stack is wound, wherein said hollow core is disposed through said central aperture of said first plate.

25. The electrochemical cell according to claim 24, wherein said hollow core has a first portion having a first diameter, and a second portion having a second diameter, wherein said second diameter is larger than said first diameter.

26. The electrochemical cell according to claim 19, wherein said first plate includes a second aperture therein.

27. The electrochemical cell according to claim 26, wherein said second plate includes an aperture.

28. The electrochemical cell according to claim 27, wherein said aperture of said second plate is aligned with said second aperture of said first plate.

29. The electrochemical cell according to claim 17, wherein said second plate includes at least one raised portion extending from said top surface of said second plate.

30. The electrochemical cell according to claim 29, wherein said at least one raised portion includes a rounded nipple.

31. The electrochemical cell according to claim 29, wherein said at least one raised portion includes a plateau.

32. The electrochemical cell according to claim 31, wherein said plateau includes a surface which is parallel to said top surface of said second plate.

33. The electrochemical cell according to claim 17, wherein said first plate and said second plate are made of the same material.

34. The electrochemical cell according to claim 33, wherein said first plate and said second plate are made of the same material as said at least one current collection tab.

35. The electrochemical cell according to claim 17, wherein said first plate is made of copper and said second plate is made of nickel.

* * * * *